US008594883B2

(12) United States Patent
Gilbert

(10) Patent No.: US 8,594,883 B2
(45) **Date of Patent: *Nov. 26, 2013**

(54) DATA METER WITH BAR GRAPH AND HISTOGRAM

(75) Inventor: Harry M. Gilbert, Portage, MI (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 456 days.

This patent is subject to a terminal disclaimer.

(21) Appl. No.: 12/351,421

(22) Filed: Jan. 9, 2009

(65) Prior Publication Data

US 2010/0179717 A1 Jul. 15, 2010

(51) Int. Cl.
*G06F 7/02* (2006.01)

(52) U.S. Cl.
USPC .......................................... 701/33.8; 701/33.2

(58) Field of Classification Search
USPC .................................... 701/29, 33, 33.8, 33.2
See application file for complete search history.

(56) References Cited

U.S. PATENT DOCUMENTS 3,946,364 A * 3/1976 Codomo et al. .................. 701/3
4,811,240 A * 3/1989 Ballou et al. .................. 715/763
5,034,893 A * 7/1991 Fisher ............................. 701/99
5,050,081 A * 9/1991 Abbott et al. ................... 701/14
5,531,107 A * 7/1996 Ganzhorn, Jr. ............. 73/116.06
5,668,542 A * 9/1997 Wright .......................... 340/971
5,764,139 A * 6/1998 Nojima et al. ................ 340/461
6,138,065 A * 10/2000 Kramer ........................ 701/33.8
6,480,105 B2 * 11/2002 Edwards ....................... 340/457
6,556,902 B2 * 4/2003 Ing et al. ......................... 701/29
6,609,051 B2 * 8/2003 Fiechter et al. ................. 701/33
6,640,166 B2 * 10/2003 Liebl et al. ...................... 701/29
6,667,726 B1 * 12/2003 Damiani et al. ............... 345/1.1
6,721,634 B1 * 4/2004 Hauler et al. ..................... 701/1
6,781,512 B2 * 8/2004 Hayashi et al. ............... 340/456
6,799,259 B1 * 9/2004 Reed, Jr. ....................... 711/163
6,810,311 B2 * 10/2004 Winner et al. .................. 701/29
6,850,823 B2 * 2/2005 Eun et al. ........................ 701/29
7,089,096 B2 * 8/2006 Liebl et al. ...................... 701/29
7,116,216 B2 * 10/2006 Andreasen et al. ........... 340/438
7,228,211 B1 * 6/2007 Lowrey et al. .................. 701/29
7,254,469 B2 * 8/2007 Robb et al. ...................... 701/29
7,369,127 B1 * 5/2008 Hull ............................. 345/440
7,382,237 B2 * 6/2008 Stoschek et al. .............. 340/438
7,460,123 B1 * 12/2008 Hull ............................. 345/440
7,702,437 B2 * 4/2010 Gilbert ........................... 701/29
2002/0008702 A1 * 1/2002 Gilbert ....................... 345/440.1
2002/0077781 A1 * 6/2002 Liebl et al. .................... 702/183
2004/0064226 A1 * 4/2004 Lipscomb et al. .............. 701/29
2005/0083187 A1 * 4/2005 Birman et al. ................ 340/438
2005/0096805 A1 * 5/2005 Fudali et al. .................... 701/29
(Continued)

*Primary Examiner* — Darnell Jayne
*Assistant Examiner* — Sasha T Varghese
(74) *Attorney, Agent, or Firm* — Baker Hostetler LLP

(57) ABSTRACT

A technique and apparatus of displaying a vehicle's information on a display device are provided and include measuring a set of diagnostic and state values of the vehicle, comparing the set of measured values with a set of related predetermined values, the set of predetermined values being within a preset range for operation of the vehicle, displaying on a video image a graphical depiction of the present measured value, and displaying on the same video image, a graphical depiction of the measured set of values in comparison to the related predetermined set of values, with the comparison changing color of a certain portion of the graphical depiction.

19 Claims, 9 Drawing Sheets

(56) References Cited

U.S. PATENT DOCUMENTS

| | | | | |
|---|---|---|---|---|
| 2006/0020376 | A1* | 1/2006 | Kanno et al. | 701/21 |
| 2006/0119475 | A1* | 6/2006 | Avery et al. | 340/439 |
| 2007/0294002 | A1* | 12/2007 | Underdal et al. | 701/29 |
| 2009/0040034 | A1* | 2/2009 | Drew et al. | 340/441 |
| 2009/0043446 | A1* | 2/2009 | Drew et al. | 701/33 |
| 2009/0184812 | A1* | 7/2009 | Drew et al. | 340/438 |

* cited by examiner

DATA METER WITH BAR GRAPH AND HISTOGRAM

FIELD OF THE DISCLOSURE

The present disclosure relates generally to a display. More particularly, the present disclosure relates to a display with a plurality of representations related to vehicle diagnostics and vehicle health information.

BACKGROUND OF THE DISCLOSURE

Onboard control computers have become prevalent in motor vehicles, but as safety, economy, and emissions requirements have continued to tighten. Successive generations of onboard control computers have acquired increasing data sensing and retention capability as the electronics have advanced.

Present external diagnostic and display apparatus, known as diagnostic tools, are commonly limited to reporting the data acquired by the onboard control computer itself. Increasingly, subtle subsystem failures in vehicles overload the ability of maintenance technicians, not simply to read the faults detected and stored by the diagnostic tools themselves, but to combine those readings with peripheral measurements and deduce corrective actions with both speed and accuracy.

Currently in the automotive industry, there are both stand alone and hand-held diagnostic testers or tools used in connection with motor vehicle maintenance and repair. For example, hand-held diagnostic tools have been used to trouble-shoot faults associated with vehicular control units. Diagnostic tools detect faults based on Diagnostic Trouble Codes or DTCs that are set in the vehicle's onboard control computer. A DTC can be triggered and stored when there is a problem with the vehicle. A technician then retrieves the DTC using a diagnostic tool, repairs the associated problem and then deletes the DTC from the vehicle's computer.

Vehicle diagnostics have also been performed through personal computers. However, the display of such diagnostic information has always been difficult to read for technicians. Furthermore, technicians have also needed extensive learning in order to read such diagnostic information.

Further general vehicle health information has also been monitored through personal computers, or standalone computing modules that measure information related to emission testing. Certain sensors are attached to the vehicle to make certain measurements related to environmental emissions or safety related information of the vehicle.

The current diagnostic tools and personal computers used for vehicle diagnostics and vehicle health information are limited in the display output, thus limiting the usefulness of the diagnostic tool for a user. The limits on the current tools output capabilities include, for example, problems with the method of indicating the DTC, or vehicle health information such as the measurement of a certain sensors in the vehicle. The current diagnostic tools show the DTC on a basic display that displays the basic information and such information, then must be checked manually or through additional steps to ascertain whether the information is within the normal limits. The user must be in close proximity and in viewing distance from the diagnostic tool as the information is usually text based. For example, when a diagnostic tool detects a DTC or an emission testing result, a user must directly view the tool in order to see the DTC or emission testing readout.

The user of the diagnostic tool can be forced to use additional devices in order to supplement the limitations of output methods of today's diagnostic tools or personal computers used for diagnostic purposes. Accordingly, it is desirable to provide a method and apparatus that will allow enhanced display capabilities to a user or technician to use a diagnostic tool or diagnostic personal computer to determine the output of the vehicle's health information in a manner that is easy and quick to ascertain whether it is within certain constraints, presently and over time.

SUMMARY OF THE DISCLOSURE

The foregoing needs are met, to a great extent, by the present disclosure, wherein in one aspect an apparatus is provided that in some embodiments enhances display capabilities to a technician through a diagnostic tool or diagnostic personal computer to determine the output of the vehicle's health information in a manner that is easy and quick to ascertain whether it is within certain constraints and how it has varied over time.

In accordance with one aspect of the present disclosure, a technique of displaying a vehicle's information on a display device, includes measuring a set of diagnostic and state values of the vehicle, comparing the set of measured values with a set of related predetermined values, the set of predetermined values being within a preset range for operation of the vehicle, displaying on a video image a graphical depiction of the present measured value, and displaying on the same video image, a graphical depiction of the measured set of values in comparison to the related predetermined set of values, with the comparison changing color of a certain portion of the graphical depiction.

The comparison display can include a bar graph changing color depending on the comparison. The comparison display can also include a display of the measured values over time. The method can also include selecting the predetermined range of values. The method can also include selecting the time interval for measuring the values. The video image includes icons with values indicating the measured set of values of a health and diagnostics of the vehicle. The method can also include coloring or shading the different regions of video image according to a deviation from the normal set of values.

The method can additionally include selecting additional predetermined ranges, comparing the measured values with the additional predetermined ranges, and changing the color of certain parts of the graphical depiction depending on the comparing of the measured values with the additional predetermined ranges. The method can also include altering the video image according to the comparison of the measured values as compared to the related predetermined set of values. The method can also include the color of the measured values being dependent on a third variable in addition to the comparison to the predetermined set of values. The method can be embodied as a set of computer executable instructions stored on a computer readable media.

In another aspect of the disclosure, an apparatus for displaying a vehicle's measured information, includes a communication interface connecting to the vehicle and accommodating the measuring of the vehicle's information through a plurality of sensors, a memory connected to the communication interface, storing a software for displaying of the vehicle's measured information, a processor connected to the memory and controlling the software, the software including instructions for measuring a set values of the vehicle, and comparing the set of measured values with a set of related normal values of a vehicle of the same type as the vehicle being measured, and operating within a selected range of values, and a display displaying on a video image a graphical depiction of the measured set of values in comparison to the selected set of values of the same type of vehicle, altering the color or shading of part of the graphical depiction according to the comparison.

In another aspect of the disclosure, a system for displaying a vehicle's information, including a means for measuring a set of diagnostic and state values of the vehicle, a means for comparing the set of measured values with a set of related predetermined values, the set of predetermined values being within a preset range for operation of the vehicle, a means for displaying on a video image a graphical depiction of the present measured value, and a means for displaying on the same video image a graphical depiction of the measured set of values in comparison to the related predetermined set of values, with the comparison changing color of a certain portion of the graphical depiction.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The rapidly increasing amount of data related to the health of a vehicle make the job of diagnosing problems by reviewing lists of real-time vehicle data more and more difficult for a human technician. This has especially been difficult when the vehicle information changes rapidly and cannot be easily monitored by current displays in an efficient manner where the technician can still work on the vehicle.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
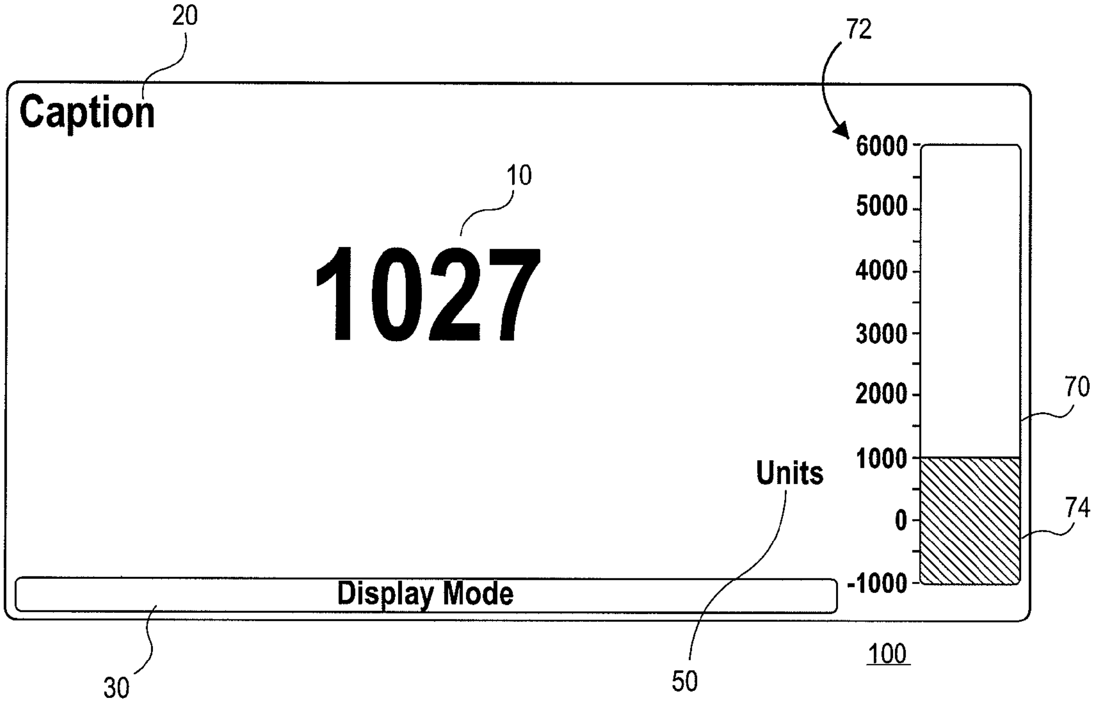
FIG. 1 is an exemplary display of the present disclosure.

The disclosure will now be described with reference to the drawing figures, in which like reference numerals refer to like parts throughout. An embodiment in accordance with the present disclosure provides an efficient means of displaying and ascertaining from the display the relative health of a vehicle and diagnostic information in relation to selected outputs and depiction of information over time. This disclosure proposes a visual health display which permits the technician to see at a glance the relative health of a vehicle system, and where the most serious problems are with a single or minimum set of views.

Manufacturers have programmed their vehicle onboard computers with complicated methods of detecting a variety of problems. Further, the United States Environmental Protection Agency has mandated that DTCs be set where there are emissions related problems with the vehicle using the Onboard Diagnostic II System, also known as the OBD II system.

However, there are still problems of using the diagnostic tool since there are limitations in the output methods of the diagnostic tool or personal computer or other computing device used to display the vehicle's health output. A user is forced to look at the display with the current vehicle health information and then go through addition steps such as looking through manuals or checking through another menu on the display to ascertain the normal outputs of the vehicle and then have to ascertain whether the current outputs are within the normal constraints or other set limitations. Users may also have to navigate through a plurality of menus to see multiple information of the vehicle status. This is all cumbersome and difficult to read while handling the vehicle at the same time.

However, the present disclosure describes a display of vehicle information that is easy to read and quick to ascertain rapidly changing information. The present embodiments are capable of monitoring the changing information of vehicle diagnostics and health information in an efficient manner. For example, a display can include the display of rapidly changing data or text values, as well as the option of viewing how the values relate to a set range or an ideal range, as well as viewing the changes in the value over time.

Referring to FIG. 1, a numerical value 10 can be displayed alone or with additional related information on a display 100. Please note that the caption 20 and units 50 can be set to identify the data and units of measure, respectively, in any language or character set. The display mode button 30 is used by the user to select progressive visual displays. For example, the user can select only the numeric value 10 of the selected vehicle measurement. The numeric value 10 can pertain to, for example, engine temperature, battery power, or other vehicle health information or diagnostic information.

The display mode 30 can be set to display a value 10 with bar graph display 70. The number scale 72 accompanying the bar graph 70 can be set to any text desired. The bar graph can be marked with specific colors related to specific significance of the value. For example, the bar graph can be colored green 74, indicating that the value is "in range", or that there are no range limits applied. "In range" would signify that the measured value is within a given range that is acceptable or desired.

As an alternative, the color change of the bar graph 70 can be substituted with changes in gray scale or even shape of the bar graph 70. Additional or alternative types of manipulations and alterations of the display 100 can be made to depict the comparison of the measured values with the range limits.

Figure 2:
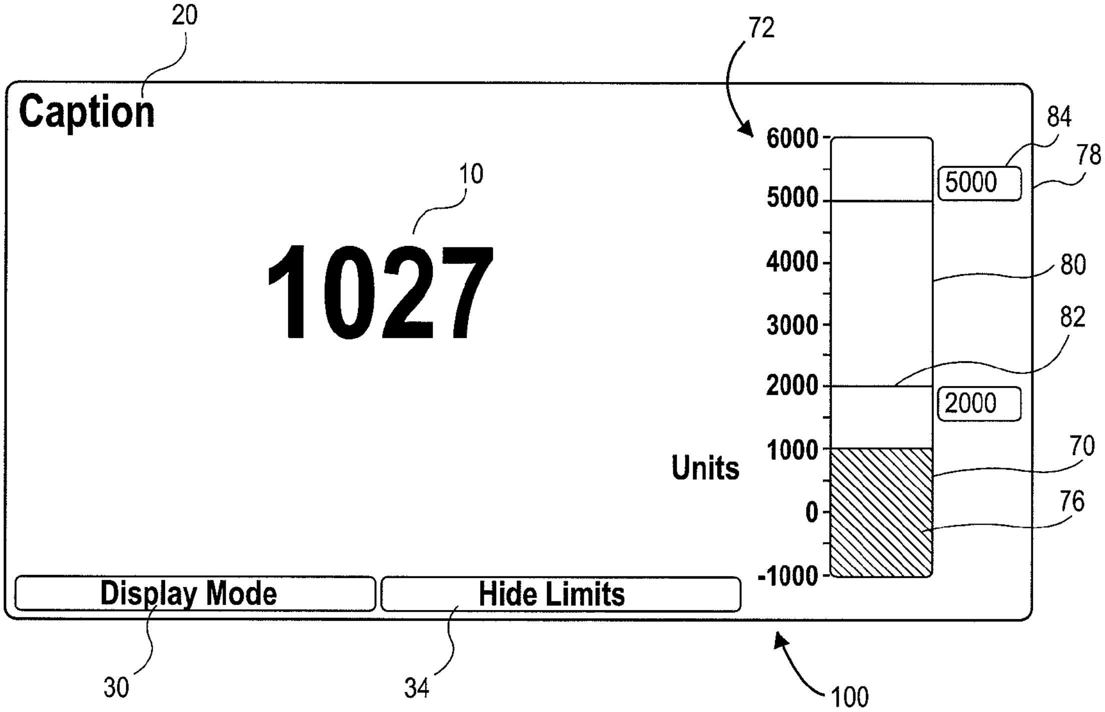
FIGS. 2 and 3 are displays of the present value with bar graph.

Referring to FIGS. 1 and 2, the color of the bar graph can change from a first color to a second color, depending on the range being selected. The bar graph changes from green 74 to red 76. The red 76 can signify that the measured value 10 is outside of the predetermined range. FIG. 2 has the same value measured of 1027, but a range has been selected to be from 2000 to 5000 instead of no range as shown in FIG. 1. The color representation can give a quick view of the significance of the measured value without having to do a manual comparison.

Referring again to FIG. 2, additional information can be displayed, such as showing the effect of having "Apply Limits" option asserted. A selection for the "Show Limits" button 34 becomes visible (not shown) and the minimum 82 and maximum 80 limit lines are shown on the bar graph 70. The actual range limit numbers 78 can also be viewed when the "Apply Limits" option is asserted. As mentioned earlier, the red color 76 indicates that the bar value is "out of range." The "Apply Limits" can be deselected for hiding the limits by hitting the "Hide Limits" button 34, in order focus the information presented in the relevant information that is desired.

When the "Show Limits" button 34 is pressed, the numeric value 78 of the limits is shown to the right of the bar graph 70, and the text of the "Show Limits" button 34 is changed to "Hide Limits" as seen in FIG. 2. Please note that all text, including "Display Mode" and "Show Limits", etc., can be modified, and localized to any language or character set.

When the option is enabled to permit the user to change limits, the limits 78 to the right of the bar graph 70 are shown with "handles" on them as seen by the highlighting 84 of the maximum and minimum limit number 78. The highlighting of the numbers 78, indicates that the user can move the limits to other positions to define new "in range" and "out of range" limits, or an automation process can manipulate the range.

Figure 3:
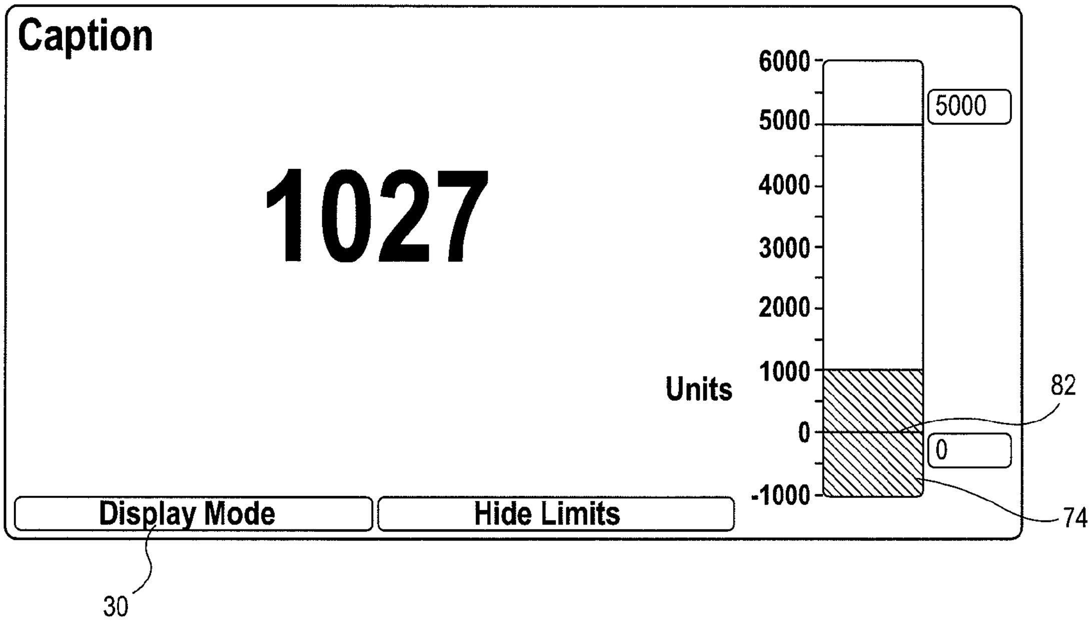

Referring to FIG. 3, the user can slide the handle for the lower limit from [2000] down to [0], causing the value to now be "in range", with the bar graph 70 color changing accordingly to green 74. Instead of the change of color, there can be a change in the gray scale of the bar graph if colors are not used.

Figure 4:
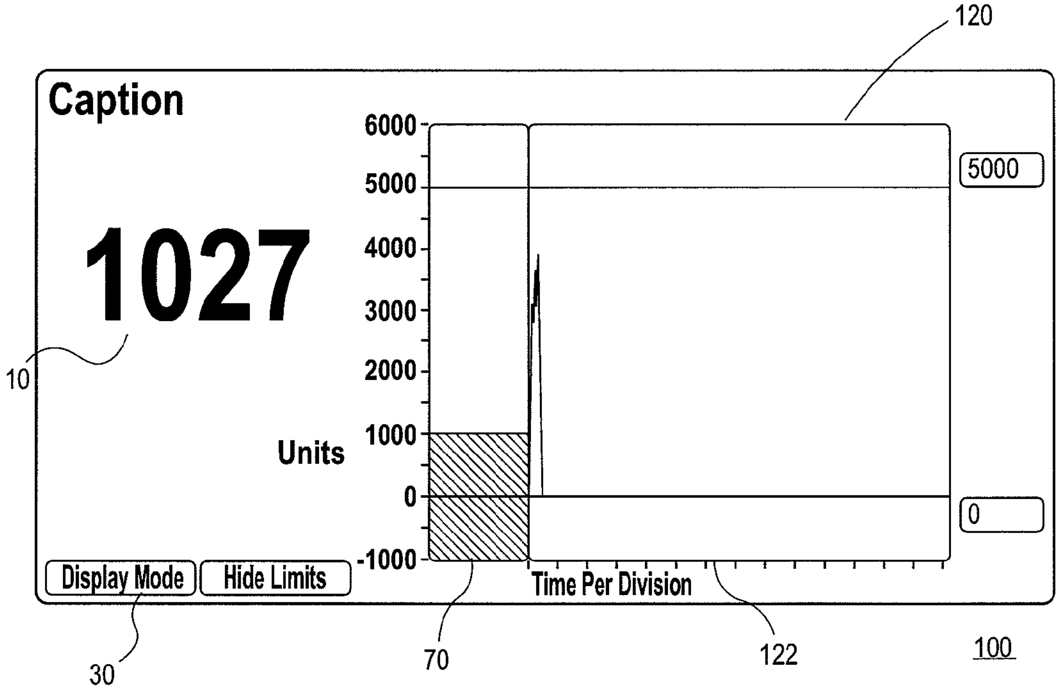
FIGS. 4 through 6 are displays incorporating time.

Referring to FIG. 4, the user can select the "Display Mode" button 30 to produce a display with value 10, bar graph 70 and histogram 120 displays. The histogram 120 shows historical values up to a given number of values, with its left-most value being the one shown in the value 10 and bar graph 70 area, with older values shown as the histogram line continues to the right. The time per division 122 can be indicated for the histogram 120. With a single view, the user can see the previous measured values and the relationship between the present value and the previous values. This may especially be helpful, where the user has to detect whether the values are decreasing or increasing. Therefore, not just a static present value is shown, but the value change over time can be indicated clearly and concisely.

Figure 5:
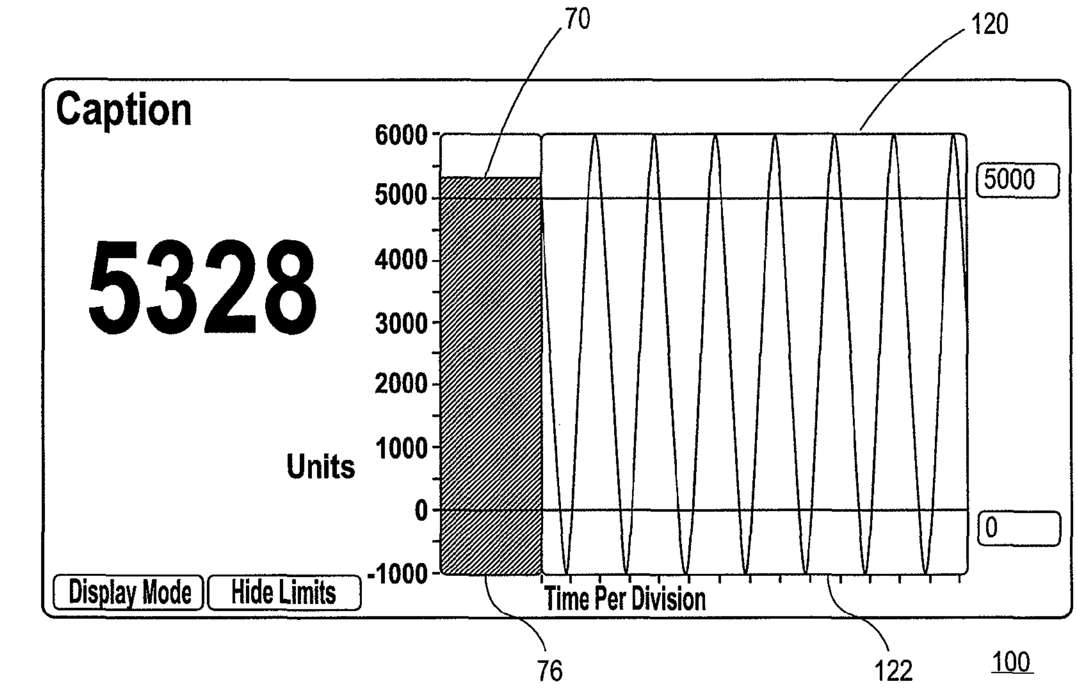

Referring to FIG. 5, a meter shows value 10, bar graph 70 and histogram 120, with the value out of range (red bar graph 76). The sinusoidal wave 120 plotting the values in the histogram 120 shows the drastic changes that can be viewed. A value 10 only display would not give the full depth of information that the display 100 shows.

In a preferred embodiment, there are also built in simulation capabilities, permitting the ability to provide simulated values without the necessity of an external data source. Examples of simulations are "random", "sine wave" or "sequential", and each simulation request produces a single new value of that data set as seen in FIG. 5. The simulation can also be helpful when planning for a certain diagnosis and viewing in a simulation mode before actual testing or repair is started. The simulation mode can also be helpful for training purposes.

Figure 6:
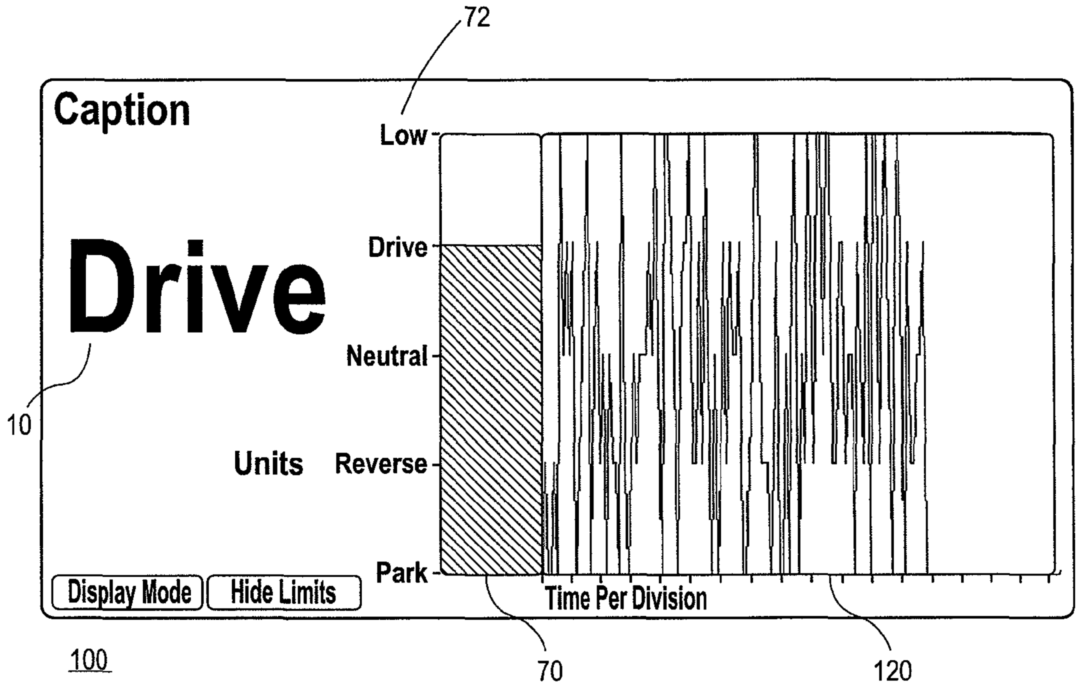

Referring to FIG. 6, the display 100 is not limited to numeric values. Text values may also be shown as members of a set, or of a sequential list, as in this display of the shift positions of an automatic transmission. The present value of "Drive" is indicated in the "value" indicator 10. The bar graph 70 indicates the corresponding value relative to other members of the set 72. Therefore, the display of FIG. 6 demonstrates the alternative capability of the invention to display "text" (scalar) values, as opposed to "numeric", and its relations to other scalar values. The text mode also has the capability of showing history with the histogram 120.

Figure 7:
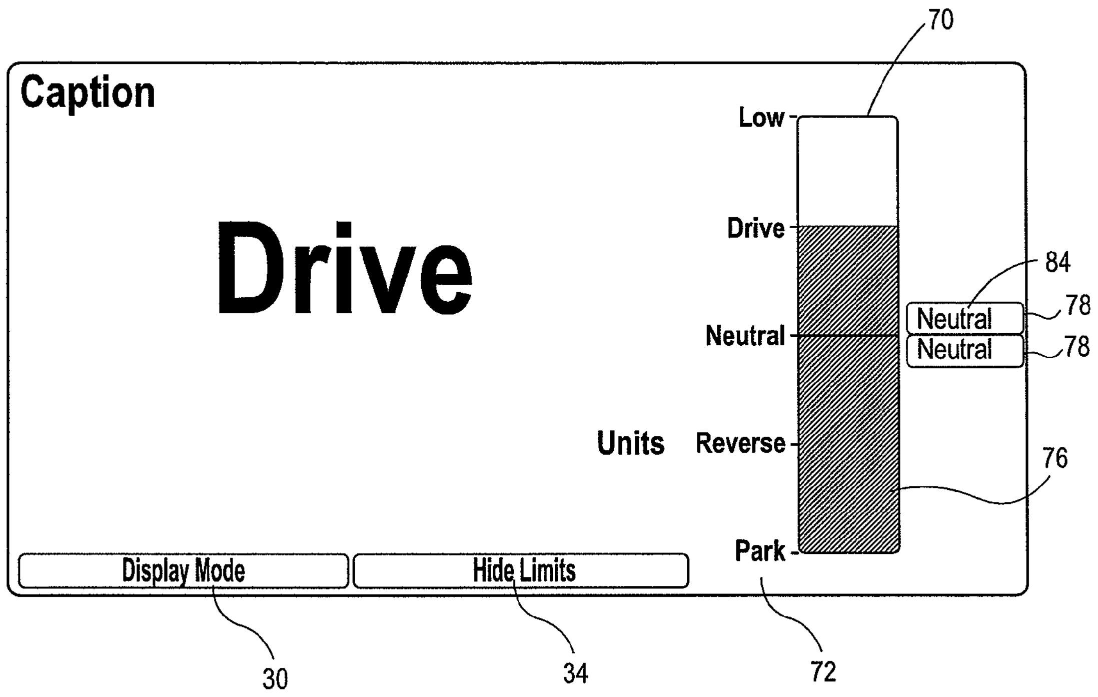
FIGS. 7 and 8 are displays of alternative groups of information.

Referring to FIG. 7, additionally, in the text mode, with limits being applied, shows that the value 10 "Drive" is outside of the acceptable range. The user can select the neutral indicator from the set of values 72 for both the maximum and minimum range. Therefore, anything that is not neutral would be outside the range and show a red 76 indicator.

When the user selects the "Show Limits" button 34, the limits 78 appear. With no "handles" 84 the user cannot move the limits. However, as seen in FIG. 7, the "handles" 84 appear in term of a highlight on the limit values 78. Therefore, a user or an automated machine can manipulate the maximum and minimum values.

In this case, the user has marked "Neutral" as both the low and high limit, thus the only value that will be considered in range. The ability for both the low- and high-limit to be identical is due to an option which permits the limits to collide and cross each other. Without this option, the limits will not be permitted to collide, and as the user slides one limit adjacent to the other, the other will shift to the next available position, as shown in the next slide.

Additional variations of the ranges can also be selected. For example, a first range can be equated with a first color, then a second range can be equated with a second color and a third range can be equated with a third color. The ranges can be or not be overlapping.

Limits shown with "handles" 84, which permit the user to move them allow the user the ability to customize the testing. However, the manufacturer of the display can limit the ability certain users to manipulate the ranges by removing such feature from the user's capabilities. This security feature is especially useful, if, for example, regional rules or laws have certain guidelines that should not be changed easily or only with an administrative security level.

Figure 8:
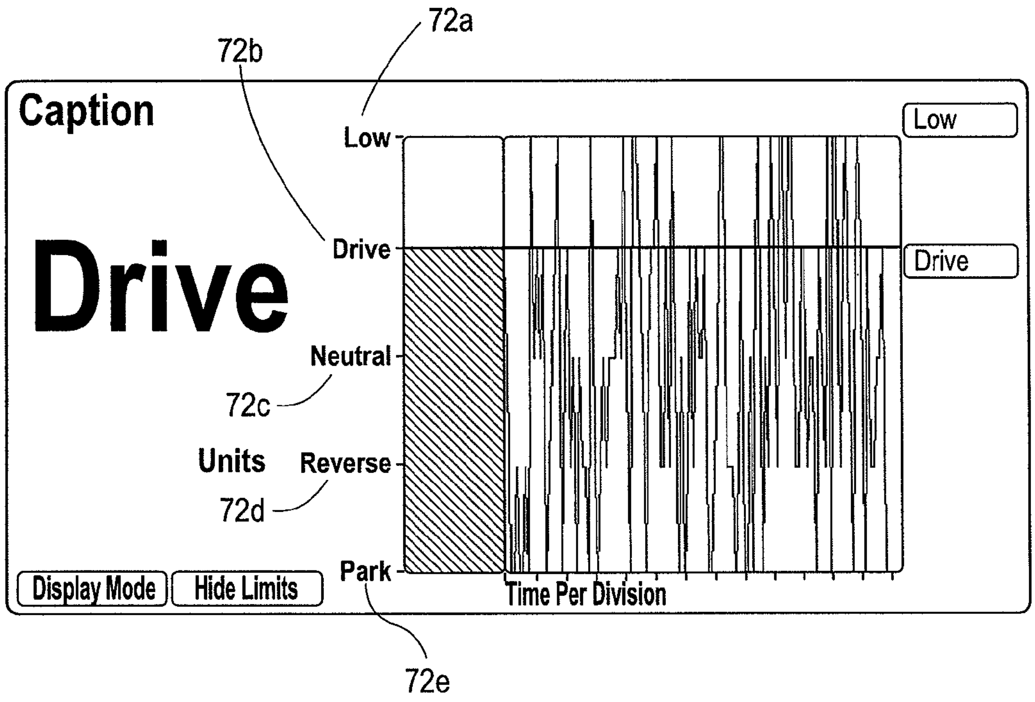

Referring to FIG. 8, the option to permit limits to collide is suppressed, so as the user slides the lower limit from "Neutral" 72*c* to "Drive" 72*b*, the upper limit is forced to the next higher limit, which in this case is "Low" 72*a*. In this position, there is no further upward movement available for the lower limit. If however the user drags the upper limit "Low" 72*a* value downward, the "Drive" 72*b* limit will be forced down to the next lower value, "Neutral" 72*c*, and so forth. Therefore, the suppression of the collision of limits can also be helpful in controlling how a user can manipulate the ranges. Therefore, a different level is security is maintained, while still allowing a certain level of customization.

Figure 9:
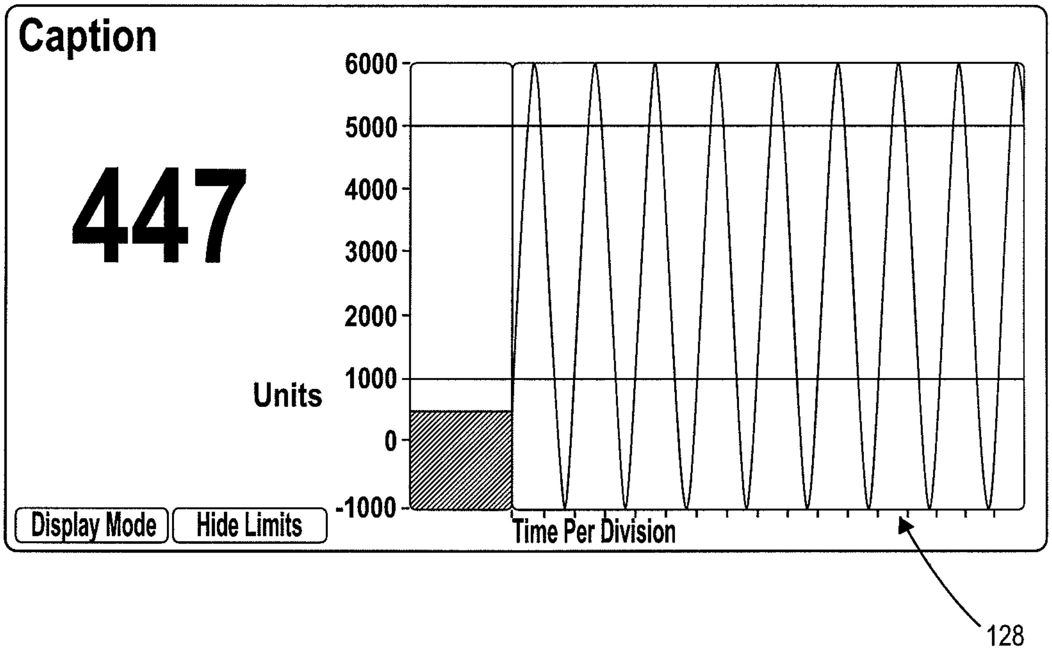
FIGS. 9 and 10 are alternative manners of display.

The display of the invention can be drawn in many styles. For example, FIG. 9 is shown in a "gradient" style in which the colors of the background, the buttons, and the bar graph are shown fading from one color to another. The x-coordinates 128 of the histogram 70 can be incremented by values from 1 and up. The example in FIG. 10 shows the x-coordinate 128 displayed with an increment of 10, resulting in a more spread-out appearance than the increment of 1 in FIG. 9.

Figure 10:
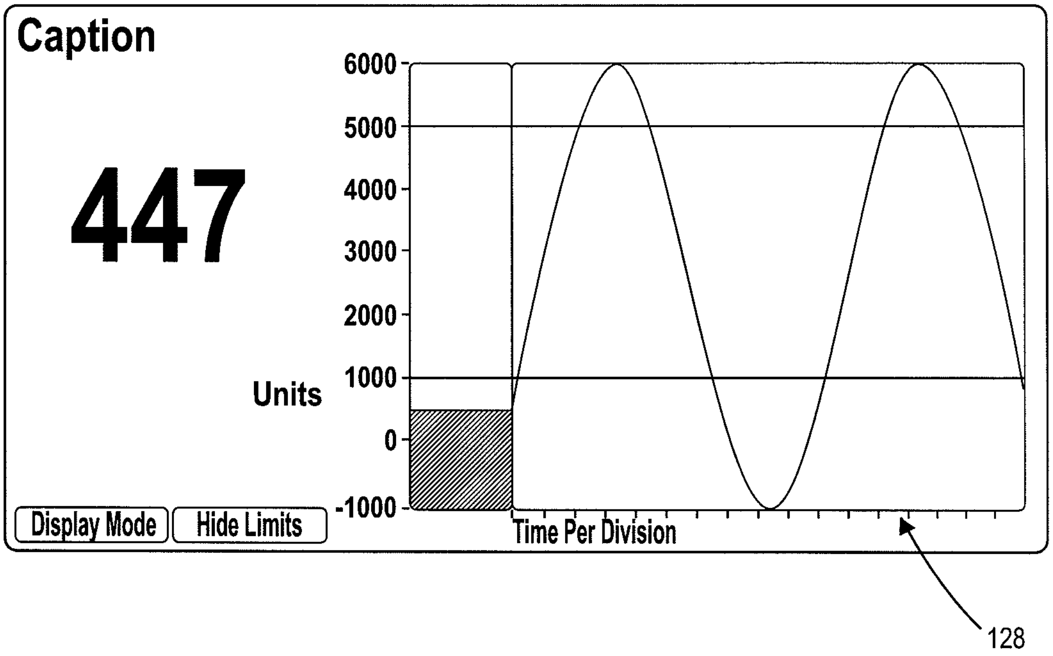

The spread-out appearance of FIG. 10 can allow for a more close-up view of the change over time. Whereas, the condensed view of FIG. 9 can show more values plotted over time in a single view.

Histograms 70 can also be shown as "straight lines" or "rounded lines", resulting in either a "spikey" appearance at peaks, or a "rounded" one. The spikey appearance can allow the user to view certain values more easily or see the change more easily in the rounded view of the curving change.

The display can also be shown without rounded corners on the overall shape, buttons, bar graph, and histogram. The setting of the simulation mode to random can show the history of numerous simulated data values. Values can be forced to be formatted into a wide variety of formats, for example, with 2 decimal places showing. All colors shown in the examples are not limiting and can be substituted with a plurality of other colors.

Figure 11:
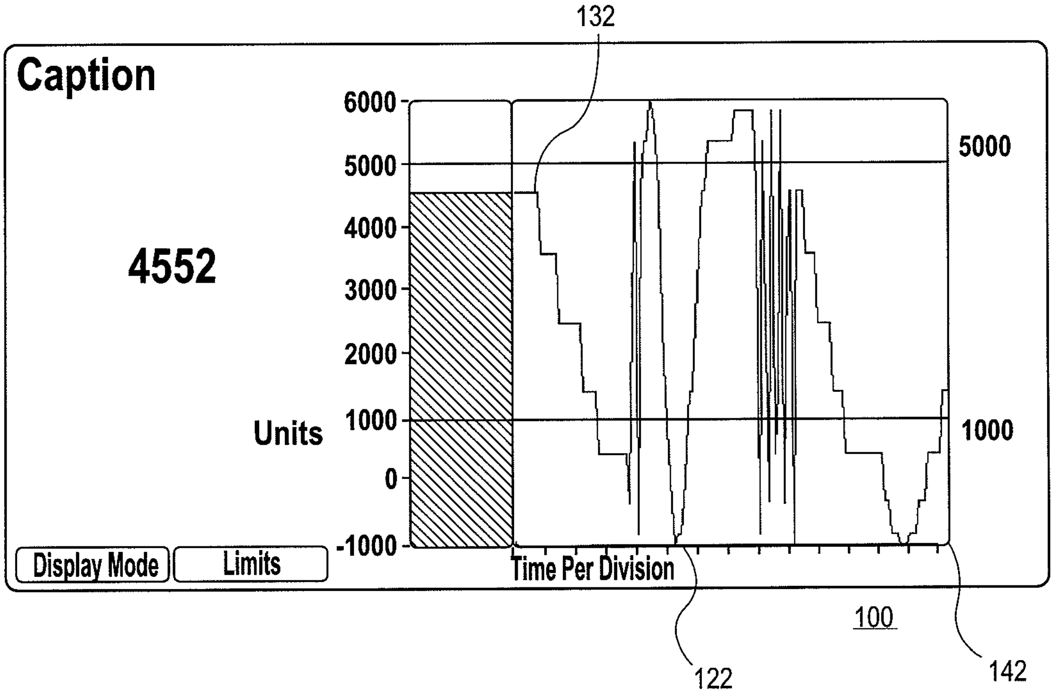
FIG. 11 is a display using auto-run feature.

Referring to FIG. 11, the display 100 also has an "autorun" feature, in which a timer is initiated and which draws a new value only at each timing interval established for it. When in this mode of "autorun", the most recent new value which is presented is cached internally in a memory device, to be displayed only at the expiration of the given timing interval. If no new value arrives, the previous value will be displayed, resulting in a flat horizontal line 132. This example show the effect of using "autorun" and requesting simulated sine wave values at irregular rates and in some cases the previous value is displayed because no new value was given, and in some cases several new values were presented (each superseding the previous value) before the next display interval. Referring back to FIG. 9, when the "autorun" feature is not enabled, then all values are drawn as they are presented to display unit 100. Therefore, the sampling rate of the determined values can be changed in the "autorun" feature.

Additional features of the display can be added or removed to increase information and yet reduce clutter of the display for easier viewing. For example, tick marks 142 and legend 122 at the bottom of the histogram display 70 can be removed or enhanced. The display can be changed in terms of border styles available for the junction between the different information. For example, the border between the histogram 120 and bar graph 70 can be changed for easier viewing and differentiation between the information and to reduce clutter with the enhanced information. The display 100 can also simulate 3D (three dimensional) effect of the shading of the border surrounding the entire area for easier viewing by the user and to differentiate between the other set of information presented.

With regard to the ranges selected, the range can be, for example, in normal constraints or constraints that are chosen because of certain regulations and guidelines. Normal constraints can be defined, for example, with a range of acceptable operation of a vehicle under certain predetermined circumstances. The range of normal values can be a set of values, for example, for the same type vehicle when it is functioning under universally acceptable standards, or under a certain set of standards that are preset by, for example, by a board. For example, normal constraints for the values can be set by a vehicle's emission board or according to state law to what are acceptable measured values.

In an embodiment of the present disclosure, the diagnostic tool or computer can run an application that accommodates a display of images that will relay to the user in an efficient manner the vehicles health or diagnostic information in relation to predetermined or selected set of data ranges that is considered the normal for a healthy vehicle or within certain regulations or guidelines or arbitrarily selected.

Figure 12:
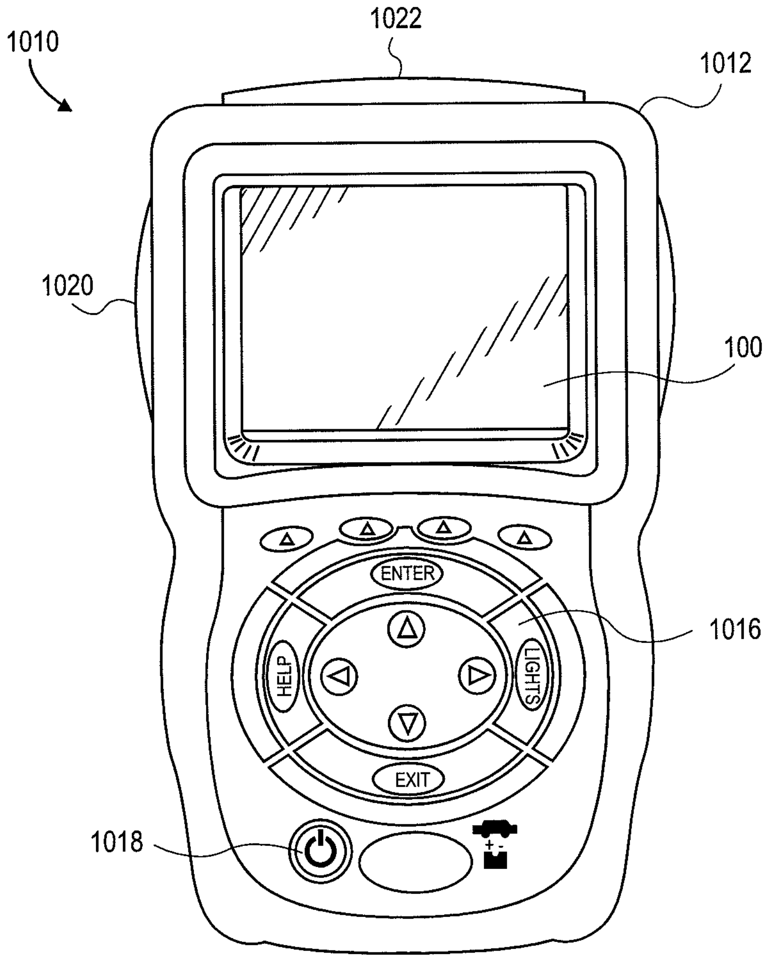
FIG. 12 is a front view of a diagnostic tool with a display.

An embodiment of the present disclosure is illustrated in FIG. 12. In particular, FIG. 12 is a front view illustrating a diagnostic tool 1010 according to an embodiment of the invention. The diagnostic tool 1010 can be any computing device, for example, the NEMISYS diagnostic tool from SERVICE SOLUTIONS (part of the SPX Corporation). The diagnostic tool 1010 includes a housing 1012 to encase the various components of the diagnostic tool 1010, such as a display 1014, a user interface 1016, a power button 1018, a memory card reader 1020 and a connector interface 1022. The display 100 can be any type display, including for example but not limited to, a liquid crystal display (LCD), organic light emitting diode (OLED), field emission display (FED), electroluminescent display (ELD), etc. In addition, the LCD, for example, can be a touch screen that both displays and performs the additional task of interfacing between the user and the diagnostic tool 1010. The user interface 1016 allows the user to interact with the diagnostic tool 1010, in order to operate the diagnostic tool as the user prefers. The user interface 1016 can include function keys, arrow keys or any other type of keys that can manipulate the diagnostic tool 1010 in order to operate the diagnostic tool through the software. The user interface or input device 1016 can also be a mouse or any other suitable input device for the user interface 1016, including a keypad, touchpad, etc. The user interface 1016 can also include keys correlating to numbers or alphanumeric characters. Moreover, as mentioned above, when the display 1014 is touch sensitive, the display 1014 can supplement or even substitute for the user interface 1016. The power key or button 1018 allows the user to turn the power to the diagnostic tool 1010 on and off, as required.

A memory card reader 1020 can be a single type card reader, such as, but not limited to, a compact flash card, floppy disk, memory stick, secure digital, flash memory or other type of memory. The memory card reader 1020 can be a reader that reads more than one of the aforementioned memory such as a combination memory card reader. Additionally, the card reader 1020 can also read any other computer readable medium, such as CD (compact disc), DVD (digital video or versatile disc), etc.

The connector interface 1022 allows the diagnostic tool 1010 to connect to an external device, such as, but not limited to, an ECU (electronic control unit) of a vehicle, a computing device, an external communication device (such as a modem), a network, etc. through a wired or wireless connection. Connector interface 1022 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

Figure 13:
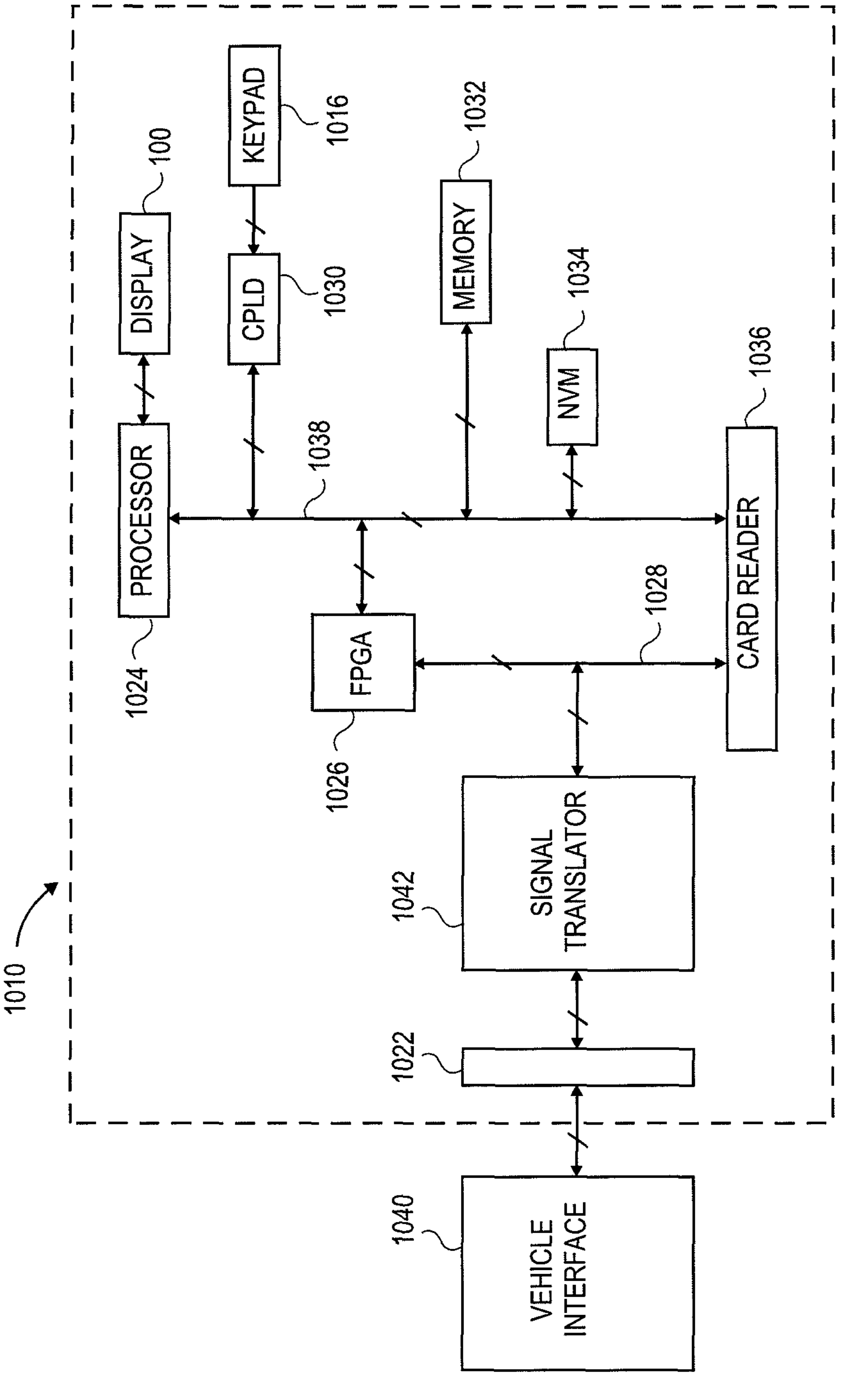
FIG. 13 is a schematic diagram of the diagnostic tool of FIG. 12.

FIG. 13 is a block diagram of the components of a diagnostic tool 1010. In FIG. 13, the diagnostic tool 1010, according to an embodiment of the invention, includes a processor 1024, a field programmable gate array (FPGA) 1026, a first system bus 1028, the display 100, a complex programmable logic device (CPLD) 1030, the user interface 1016 in the form of a keypad, a memory subsystem 1032, an internal non-volatile memory (NVM) 1034, a card reader 1036, a second system bus 1038, the connector interface 1022, and a selectable signal translator 1042. A vehicle communication interface 1040 is in communication with the diagnostic tool 1010 through connector interface 1022 via an external cable. The connection between the vehicle communication interface 1040 and the connector interface 1022 can also be a wireless connection such as BLUETOOTH, infrared device, wireless fidelity (WiFi, e.g. 802.11), etc.

The selectable signal translator 1042 communicates with the vehicle communication interface 1040 through the connector interface 1022. The signal translator 1042 conditions signals received from a motor vehicle control unit through the vehicle communication interface 1040 to a conditioned signal compatible with the diagnostic tool 1010. The translator 1042 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by the FPGA 1026 (e.g., by tri-stating unused transceivers) or by providing a keying device that plugs into the connector interface 1022 that is provided by diagnostic tool 1010 to connect diagnostic tool 1010 to vehicle communication interface 1040. Translator 1042 is also coupled to FPGA 1026 and the card reader 1036 via the first system bus 1028. FPGA 1026 transmits to and receives signals (i.e., messages) from the motor vehicle control unit through the translator 1042.

FPGA 1026 is coupled to the processor 1024 through various address, data and control lines by the second system bus 1038. FPGA 1026 is also coupled to the card reader 36 through the first system bus 1028. Processor 1024 is also coupled to the display 1014 in order to output the desired information to the user. The processor 1024 communicates with the CPLD 1030 through the second system bus 38. Additionally, the processor 1024 is programmed to receive input from the user through the user interface 1016 via the CPLD 1030. The CPLD 1030 provides logic for decoding various inputs from the user of diagnostic tool 1010 and also provides the glue-logic for various other interfacing tasks.

Memory subsystem 1032 and internal non-volatile memory 1034 are coupled to the second system bus 1038, which allows for communication with the processor 1024 and FPGA 1026. Memory subsystem 1032 can include an application dependent amount of dynamic random access memory (DRAM), a hard drive, and/or read only memory (ROM). Software to run the diagnostic tool 1010 can be stored in the memory subsystem 1032. The internal non-volatile memory 1034 can be, but not limited to, an electrically erasable programmable read-only memory (EEPROM), flash ROM, or other similar memory. The internal non-volatile memory 1034 can provide, for example, storage for boot code, self-diagnostics, various drivers and space for FPGA images, if desired. If less than all of the modules are implemented in FPGA 1026, the non-volatile memory 1034 can contain downloadable images so that FPGA 1026 can be reconfigured for a different group of communication protocols.

Figure 14:
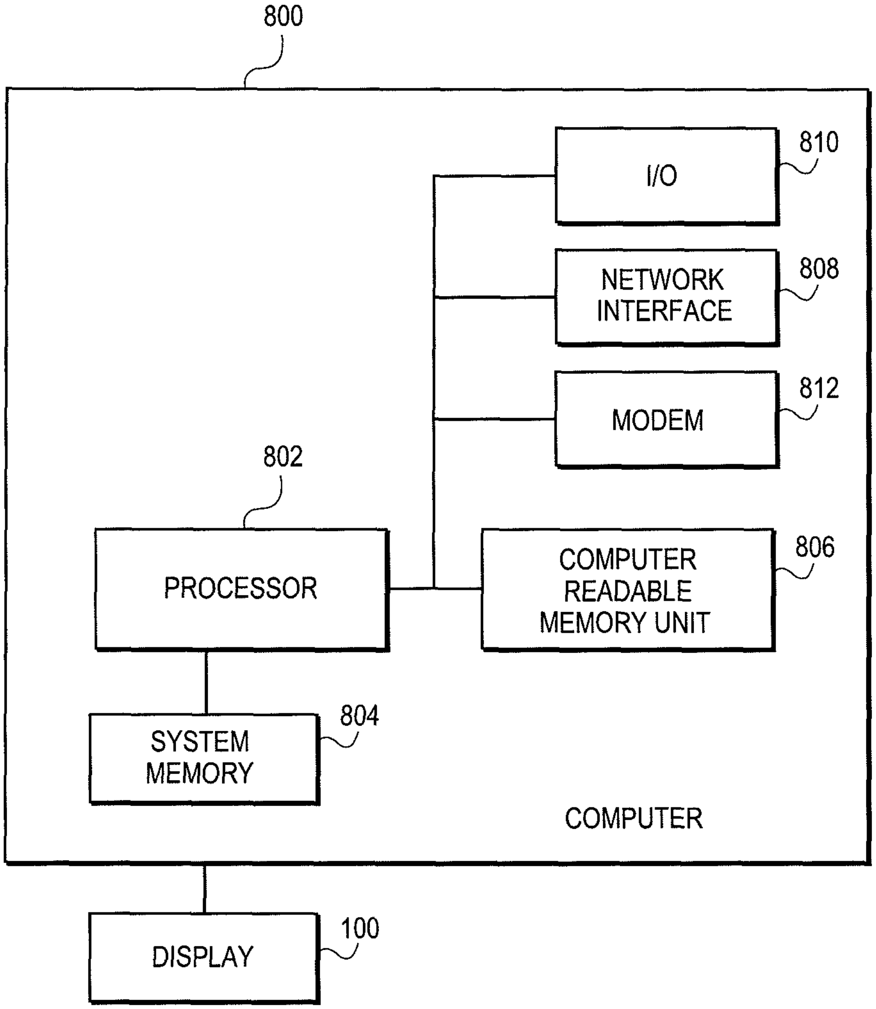
FIG. 14 illustrates the schematics of an exemplary computer that is capable of displaying the vehicle information of the present disclosure.

Referring to FIG. 14, the display 100 of the present disclosure can also be included on a personal computer that attaches to a vehicle for measurement of diagnostic and vehicle health information. An example of a computer, but not limited to this example of the computer 800, that can read computer readable media that includes computer-executable instructions. The computer 852 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the computer 800 can output through, for example, the I/O 810, data for display on a display device 100.

The invention can be realized as computer-executable instructions in computer-readable media as shown in FIG. 14. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The invention can include the computer-readable medium having stored thereon a data structure including a plurality of fields containing data representing the techniques of the invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of displaying vehicle information on a display device, the method comprising:

measuring, via a processor, a value of a vehicle health characteristic;

comparing, via the processor, the value of the vehicle health characteristic with a first set of related predetermined values of the vehicle health characteristic, the first set of related predetermined values including a first upper limit value and a first lower limit value of the vehicle health characteristic;

displaying, on a display, an alphanumeric depiction of the value of the vehicle health characteristic, an alphanumeric depiction of the first upper limit value, an alphanumeric depiction of the first lower limit value, and a graphical depiction of the value of the vehicle health characteristic in comparison with the first set of related predetermined values;

receiving, via the processor, an indication to modify at least one of the first upper limit value and the first lower limit value, resulting in a second set of related selected values of the vehicle health characteristic, the second set of related selected values including a second upper limit value and a second lower limit value of the vehicle health characteristic;

comparing, via the processor, the value of the vehicle health characteristic with the second set of related selected values of the vehicle health characteristic; and displaying, on the display, the alphanumeric depiction of the value of the vehicle health characteristic, an alphanumeric depiction of the second upper limit value, an alphanumeric depiction of the second lower limit value, and a graphical depiction of the value of the vehicle health characteristic in comparison with the second set of related selected values.

2. The method of claim 1, wherein the graphical depiction comprises a bar graph that changes color based on each comparison.

3. The method of claim 1, wherein the graphical depiction comprises a display of a plurality of values of the vehicle health characteristic over different time intervals.

4. The method of claim 1, further comprising selecting at least one of the first set of related predetermined values and the second set of related selected values via a user interface.

5. The method of claim 1, further comprising selecting different time intervals for measuring values of the vehicle health characteristic via a user interface.

6. The method of claim 1, further comprising graphically differentiating regions of the graphical depiction of the value of the vehicle health characteristic in comparison with the first set of related predetermined values outside of a range between the first upper limit value and the first lower limit value.

7. The method of claim 1, wherein the first set of related predetermined values and the second set of related selected values correspond to different colors in the graphical depiction.

8. The method of claim 1, further comprising receiving, via the processor, an indication to display the alphanumeric depiction of the first upper limit value and the alphanumeric depiction of the first lower limit value on the display.

9. The method of claim 1, wherein receiving the indication to modify the at least one of the first upper limit value and the first lower limit value comprises highlighting the alphanumeric depiction of the first upper limit value and the alphanumeric depiction of the first lower limit value on the display.

10. The method of claim 1, further comprising receiving, via the processor, an indication to hide the alphanumeric depiction of the first upper limit value and the alphanumeric depiction of the first lower limit value on the display.

11. The method of claim 1, wherein:

the alphanumeric depiction of the value of the vehicle health characteristic, the alphanumeric depiction of the first upper limit value, the alphanumeric depiction of the first lower limit value, and the graphical depiction of the value of the vehicle health characteristic in comparison with the first set of related predetermined values are displayed at a first time; and the alphanumeric depiction of the value of the vehicle health characteristic, the alphanumeric depiction of the second upper limit value, the alphanumeric depiction of the second lower limit value, and the graphical depiction of the value of the vehicle health characteristic in comparison with the second set of related selected values are displayed at a second time following the first time.

12. An apparatus for displaying vehicle information, the apparatus comprising:

a communication interface that connects to a vehicle and receives a value of a vehicle health characteristic measured by at least one sensor;

a memory connected to the communication interface, the memory storing software for displaying the value of the vehicle health characteristic;

a processor connected to the memory, the processor being configured to compare the value of the vehicle health characteristic with a first set of related predetermined values of the vehicle health characteristic and a second set of related selected values of the vehicle health characteristic, and enabling modification of the first set of related predetermined values, including a first upper limit and a first lower limit, resulting in the second set of related selected values, including a second upper limit and a second lower limit; and a display displaying, at a first time, an alphanumeric depiction of the value of the vehicle health characteristic, an alphanumeric depiction of the first upper limit value, an alphanumeric depiction of the first lower limit value, and a graphical depiction of the value of the vehicle health characteristic in comparison with the first set of related predetermined values and, at a second time following the first time, the alphanumeric depiction of the value of the vehicle health characteristic, an alphanumeric depiction of the second upper limit value, an alphanumeric depiction of the second lower limit value, and a graphical depiction of the value of the vehicle health characteristic in comparison with the second set of related selected values.

13. The apparatus of claim 12, wherein the graphical depiction comprises a bar graph that changes color based on each comparison, and a histogram depicting measured values of the vehicle health characteristic over different time intervals.

14. The apparatus of claim 12, wherein regions of the graphical depiction are graphically differentiated based on a deviation of the value of a vehicle health characteristic above the first upper limit value or below the first lower limit value.

15. A system for displaying vehicle information, the system comprising:

means for measuring a value of a vehicle health characteristic;

means for comparing the value of the vehicle health characteristic with a first set of related predetermined values of the vehicle health characteristic, the first set of related predetermined values including a first upper limit value and a first lower limit value of the vehicle health characteristic;

means for displaying an alphanumeric depiction of the value of the vehicle health characteristic, an alphanumeric depiction of the first upper limit value, an alphanumeric depiction of the first lower limit value, and a graphical depiction of the value of the vehicle health characteristic in comparison with the first set of related predetermined values;

means for receiving an indication to modify at least one of the first upper limit value and the first lower limit value, resulting in a second set of related selected values of the vehicle health characteristic, the second set of related selected values including a second upper limit value and a second lower limit value of the vehicle health characteristic;

means for comparing the value of the vehicle health characteristic with the second set of related selected values of the vehicle health characteristic; and means for displaying the alphanumeric depiction of the value of the vehicle health characteristic, an alphanumeric depiction of the second upper limit value, an alphanumeric depiction of the second lower limit value, and a graphical depiction of the value of the vehicle health characteristic in comparison with the second set of related selected values.

16. The system of claim 15, wherein the graphical depiction comprises a bar graph that changes color based on each comparison.

17. The system of claim 15, wherein the graphical depiction comprises a display of a plurality of values of the vehicle health characteristic over different time intervals.

18. The system of claim 15, further comprising means for selecting at least one of the first set of related predetermined values and the second set of related selected values.

19. The system of claim 15, further comprising means for selecting different time intervals for measuring values of the vehicle health characteristic.

* * * * *